Oct. 2, 1923.
J. P. CROWLEY
1,469,382
METHOD OF MAKING SHEET GLASS
Filed June 10, 1919
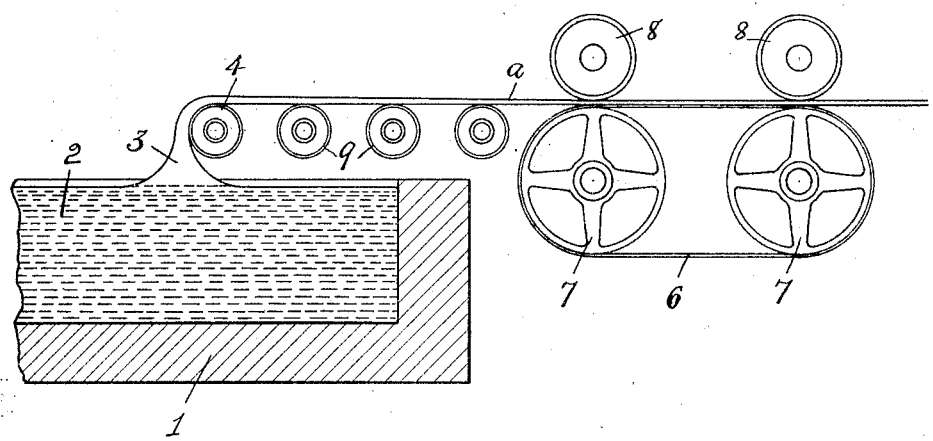
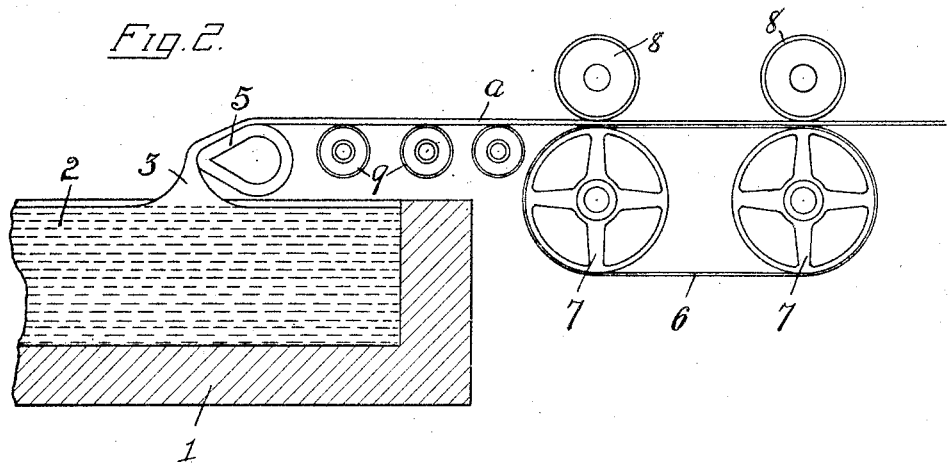
INVENTOR
Joseph P. Crowley,
By Owen, Owen & Crampton
His attys.

Patented Oct. 2, 1923.

1,469,382

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD OF MAKING SHEET GLASS.

Application filed June 10, 1919. Serial No. 303,069.

*To all whom it may concern:*

Be it known that I, JOSEPH P. CROWLEY, a citizen of the United States, and a resident of Toledo, in the county of Lucas and State of Ohio, have invented a certain new and useful Method of Making Sheet Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of sheet glass, and particularly to improvements on the method of drawing sheet glass wherein the glass is drawn vertically in sheet form from a hot or molten source of supply, a distance to enable the glass to become substantially set and is then directed laterally or horizontally over a bending roll, the sheet being stretched to size intermediate the source and bending roll.

In the drawing of sheet glass in this manner considerable difficulty is experienced by reason of the marring or forming of blemishes and defects in the sheet by the bending roll as the sheet passes thereover, and it is important with this method to keep the bending roll at the proper temperature for if too hot or too cold, the glass will stick thereto to the injury of the sheet.

The object of my invention is to draw sheet glass free from the blemishes, burn, impressions, unequal skin tensions, and other defects caused by drawing and bending a sheet of glass over a roll when the sheet has lost its elasticity to such an extent that it is susceptible to defects that cannot be removed after it is in a horizontal plane, and this is accomplished broadly by drawing the molten glass continuously in mass form vertically from the molten source of supply and thence laterally over a bending or directing member which assists in flattening the mass in sheet form, and applying a drawing stress to the mass in spaced relation to the bending or directing member so that the sheet is stretched to size without injury to the sheet after passing over said member.

The invention is fully described in the following specification, and while, in its broader aspect, it is capable of embodiment in numerous forms, a preferred embodiment thereof is illustrated in the accompanying drawings, in which,—

Figure 1 is a vertical sectional view of a source of molten glass supply with a sheet of glass being drawn therefrom by my method, and Fig. 2 is a similar view thereof with the bending member of the sheet drawing and guiding means slightly modified.

Referring to the drawings, 1 designates a receptacle containing a quantity of molten glass 2 from which the sheet is to be drawn. In practicing the method embodying the invention, the glass in desired quantity is drawn upward and from the glass in the receptacle 1, initially by the use of a bait, and while the glass is still in its mass formation as at 3, or before being reduced to final sheet thickness and while still in a highly heated state it is drawn laterally over a bending member or deflector. This member may constitute a roll 4, as shown in Fig. 1, a stationary member 5, as shown in Fig. 2, or other means suitable for the purpose. The sheet is drawn preferably horizontally or substantially so, from the bending member and is reduced in thickness or extended or stretched to size by a suitable drawing means located at such distance from the bending or directing member that the glass sheet will have become sufficiently cool before being gripped by the drawing means as to prevent injury to the sheet surfaces.

While the drawing means may be of any suitable construction it is illustrated as comprising an endless apron 6 passing around and guided by rolls 7, 7, and the sheet is frictionally gripped to the apron in opposition to its carrying rolls, by rolls 8, 8. Either or both of the rolls 7 and 8 may be positively driven in any suitable manner. This form of drawing mechanism is not here claimed but has been made the subject matter of divisional application, Serial Number 492,324, filed August 15, 1921. The drawn sheet which is designated *a*, may be supported intermediate the bending or drawing member 4 or 5 and the drawing means by rolls 9, to prevent sagging of the soft or plastic portions of the sheet. The rolls 9 and directing members 4 or 5 are preferably hollow and water cooled.

While the bending member should be kept cool in the practicing of my method it is not important to keep it at any particular temperature or within a narrow range of temperatures, as the glass while in a highly heated plastic state will flow freely over the bending member when cold or fairly cool.

It is evident in the use of my method that the sheet is initially drawn from the molten glass by the use of a bait, as well understood in the art, which bait should be substantially of a length corresponding to the width of the sheet which it is desired to draw, and that the glass immediately as it is drawn from the molten source takes a shape substantially as illustrated. While it is preferable to dispose the bending or directing member adjacent to the surface of the molten glass from which the sheet is drawn so that the mass drawn from the source has contact with the bending member before assuming a sheet form and while in a highly plastic condition, it will be understood that the bending means may be spaced a greater extent from the molten source than illustrated provided the glass passes thereover while in a highly heated and plastic condition.

I wish it understood that my invention is capable of numerous modifications and changes without departing from the spirit of the claims and that it is not limited to use in connection with any particular apparatus.

Having thus described my invention, what I claim as new and desire to secure by Letters Patent, is,—

1. The method of forming sheet glass consisting in drawing a mass of glass from a molten source, passing the mass laterally while in a highly heated plastic condition over a bending member and extending it lengthwise to form a sheet before it cools sufficiently to lose its plasticity.

2. The method of forming sheet glass consisting in continuously drawing a mass of glass upward from a molten source and laterally over and from a bending member disposed adjacent to the surface of the source from which the glass is drawn, and applying a drawing stress to the sheet at a distance from the bending member to stretch it to size after passing over the bending member.

3. The method of forming sheet glass consisting in continuously drawing a transversely elongated body of glass upward from the surface of a molten source of supply and while still highly heated and in a workable state passing it laterally over and from a bending member, and applying a drawing stress to the sheet at a distance from the bending member to stretch the sheet to predetermined thickness after passing over the bending member.

4. The method of forming sheet glass consisting in continuously drawing a transversely elongated body of hot glass vertically from the surface of a molten source of supply and laterally over a bending member disposed adjacent to the source and horizontally therefrom, the drawing stress being applied at a distance from the bending member and to the sheet at a point where it has become set to stretch the body into a sheet of predetermined width and thickness during its horizontal movements.

5. The method of drawing sheet glass horizontally from a receptacle containing molten glass, consisting in drawing hot glass from the upper surface of the molten mass over a cooled deflector adjacent the surface of the mass, and then extending this hot plastic glass horizontally into sheet form before it cools sufficiently to lose its plasticity.

In testimony whereof I have signed my name to this specification.

JOSEPH P. CROWLEY.